US009100658B2

(12) United States Patent
Wu et al.

(10) Patent No.: US 9,100,658 B2
(45) Date of Patent: Aug. 4, 2015

(54) METHOD AND ARRANGEMENT FOR VIDEO CODING

(75) Inventors: Zhuangfei Wu, Solna (SE); Kenneth Andersson, Gävle (SE); Clinton Priddle, Indooroopilly (AU); Thomas Rusert, Kista (SE); Rickard Sjöberg, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 608 days.

(21) Appl. No.: 13/515,409

(22) PCT Filed: Dec. 17, 2010

(86) PCT No.: PCT/SE2010/051413
§ 371 (c)(1),
(2), (4) Date: Jun. 12, 2012

(87) PCT Pub. No.: WO2011/075072
PCT Pub. Date: Jun. 23, 2011

(65) Prior Publication Data
US 2012/0250766 A1    Oct. 4, 2012

Related U.S. Application Data

(60) Provisional application No. 61/287,242, filed on Dec. 17, 2009.

(51) Int. Cl.
H04N 7/32        (2006.01)
H04N 19/573    (2014.01)
(Continued)

(52) U.S. Cl.
CPC ............ *H04N 19/573* (2014.11); *H04N 19/46* (2014.11); *H04N 7/26015* (2013.01);
(Continued)

(58) Field of Classification Search
None
See application file for complete search history.

(56) References Cited

U.S. PATENT DOCUMENTS 6,535,558 B1    3/2003   Suzuki et al.
8,428,373 B2 *  4/2013   Jeon et al. .................... 382/236
(Continued)

FOREIGN PATENT DOCUMENTS

EP    1427216 A1    9/2004
RU    2317654 C2    2/2008
(Continued)

OTHER PUBLICATIONS

Huo et al. "A Flexible Reference Picture Selection Method for Spatial Direct Mode in Multiview Video Coding". Congress on Image and Signal Processing, May 27-30, 2008; pp. 268-272; vol. 1.
(Continued)

*Primary Examiner* — Sath V Perungavoor
*Assistant Examiner* — Janese Duley
(74) *Attorney, Agent, or Firm* — Coats & Bennett, P.L.L.C.

(57) ABSTRACT

Methods and arrangements in video encoding and decoding entities. The methods and arrangements involve determining (804) the frequency of occurrence of a plurality of reference pictures associated with an obtained (802) set of blocks, which are neighbors of a block B. The methods and arrangements further involve selecting (806) a reference picture or combination of reference pictures having the highest determined frequency of occurrence to be a prediction, Cpred, of the reference picture or combination of reference pictures, C, to be used when encoding/decoding the block, B. The methods and arrangements further involve providing/obtaining (610,612, 808) an indication specifying whether the prediction, Cpred, corresponds to C, and when the prediction, Cpred, is indicated to correspond to C, the encoded block, $B_e$, is decoded (812) based on the prediction Cpred.

26 Claims, 12 Drawing Sheets

(51) Int. Cl.
*H04N 19/46* (2014.01)
*H04N 19/172* (2014.01)
*H04N 19/176* (2014.01)
*H04N 19/103* (2014.01)
*H04N 19/102* (2014.01)
*H04N 19/105* (2014.01)
*H04N 19/70* (2014.01)
*H04N 19/154* (2014.01)

(52) U.S. Cl.
CPC ....... *H04N 7/26031* (2013.01); *H04N 7/26244* (2013.01); *H04N 7/26271* (2013.01); *H04N 19/105* (2014.11); *H04N 19/154* (2014.11); *H04N 19/70* (2014.11)

(56) References Cited

U.S. PATENT DOCUMENTS

| | | | |
|---|---|---|---|
| 2001/0056565 A1* | 12/2001 | Li | 714/786 |
| 2004/0028282 A1 | 2/2004 | Kato et al. | |
| 2004/0141615 A1 | 7/2004 | Chujoh et al. | |
| 2004/0213468 A1 | 10/2004 | Lee et al. | |
| 2004/0234144 A1* | 11/2004 | Sugimoto et al. | 382/239 |
| 2005/0053156 A1 | 3/2005 | Lin et al. | |
| 2005/0185713 A1* | 8/2005 | Winger et al. | 375/240.12 |
| 2006/0093038 A1 | 5/2006 | Boyce | |
| 2006/0133492 A1* | 6/2006 | Boyce | 375/240.16 |
| 2006/0153297 A1 | 7/2006 | Boyce | |
| 2008/0159638 A1 | 7/2008 | Song et al. | |
| 2009/0067505 A1* | 3/2009 | Tourapis et al. | 375/240.16 |
| 2009/0168886 A1 | 7/2009 | Ikeda et al. | |
| 2009/0187960 A1 | 7/2009 | Lee et al. | |
| 2010/0129052 A1 | 5/2010 | Fujinami et al. | |

FOREIGN PATENT DOCUMENTS

| | | |
|---|---|---|
| RU | 2335856 C1 | 10/2008 |
| WO | 03026296 A1 | 3/2003 |

OTHER PUBLICATIONS

Puri et al. "Video Coding using the H.264/MPEG-4 AVC compression standard". Signal Processing: Image Communication 19, 2004, pp. 793-849, Elsevier.

Jeon et al. "Advanced temporal direct mode in B pictures". Electronics Letters, Feb. 19, 2004; pp. 234-235, vol. 40 No. 4.

International Telecommunication Union. "Series H: Audiovisual and Multimedia Systems Infrastructure of audiovisual services—Coding of moving video." ITU-T Telecommunication Standardization Sector of ITU; Mar. 2009; pp. 1-647; ITU-T H.264; printed in Geneva, Switzerland.

* cited by examiner

| 1 | 2 | 0 |
|---|---|---|
| 1 | curr | |

Count_0 = 1  
Count_1 = 2  } highest count = 2  
Count_2 = 1

Prediction = 1

Figure 1

| 2 | 2 | 1 | 1 | 1 |
|---|---|---|---|---|
| 2 | current block | | | |
| 2 | | | | |
| 1 | | | | |
| 0 | | | | |

Count_0 = 1  
Count_1 = 4  } highest count = 4  
Count_2 = 4

Prediction = 1

Figure 2

| Index symbol | codeword |
|---|---|
| 0 | 0 |
| 1 | 10 |
| 2 | 11 |

Figure 3 (prior art)

| Index symbol | codeword |
|---|---|
| Equal to prediction | 0 |
| Unequal to prediction | 10 |
| Unequal to prediction | 11 |

Figure 4

|  | AVC | RIS |
|---|---|---|
| Number of reference picture lists | 2 | 1 |
| Reference index contained in each list | L0: 0, 1<br>L1: 0, 1 | L: 0, 1, 2, 3, 4, 5, 6, 7 |
| Uni-directional prediction | List = L0; Idx = 0 | Idx = 0 |
| | List = L1; Idx= 0 | Idx = 1 |
| | List = L0; Idx = 1 | Idx = 3 |
| | List = L1; Idx = 1 | Idx = 4 |
| Bi-prediction | List = L0; Idx = 0,<br>List = L1; Idx = 0 | Idx = 2 |
| Bi-prediction | List = L0; Idx = 1,<br>List = L1; Idx = 1 | Idx = 5 |
| Bi-prediction | List = L0; Idx = 0,<br>List = L1; Idx = 1 | Idx = 6 |
| Bi-prediction | List = L0; Idx = 1,<br>List = L1; Idx = 0 | Idx = 7 |

Figure 12

METHOD AND ARRANGEMENT FOR VIDEO CODING

TECHNICAL FIELD

The invention relates generally to a method and an arrangement for encoding and decoding of information related to video coding.

BACKGROUND

Video coding may be performed in intra mode and/or inter mode. Intra mode exploits redundancies within a video frame, and inter mode exploits redundancies between video frames. In inter mode, pixel luma/chroma predictions are obtained from already coded/decoded pictures called reference pictures. Depending on the number of reference pictures used for prediction, inter mode is categorized into uni-prediction mode (or uni-directional mode), bi-prediction mode (B mode), and possibly tri-prediction mode, etc., where, respectively, 1, 2 and 3 reference pictures are used. Within this document, these different modes, i.e. uni-prediction, bi-prediction, etc., will be referred to as "reference modes".

Advanced Video Coding (AVC), which is also known as H.264 and MPEG-4 Part 10, is the state of the art standard for 2D video coding from ITU-T (International Telecommunication Union-telecommunication Standardization Sector) and MPEG (Moving Picture Experts Group). The AVC codec is a hybrid codec, which takes advantage of eliminating redundancies between frames and within a frame.

In AVC, two reference lists are defined, in which indicators of the relevant reference pictures are placed in a certain order. These indicators are denoted reference indices in AVC, and are numbered from 0 to N, such as e.g. (0, 1, ..., N). The first list, list 0 (L0), primarily manages the past reference pictures, i.e. reference pictures preceding a current picture in time, and the second list, list 1 (L1), typically manages the future reference pictures, i.e. reference pictures subsequent to a current picture in time. For low delay video coding, L1 may also manage past reference pictures. Each list can hold indicators of up to 15 reference pictures, i.e. the number N of indices is N=14.

Further, in AVC, an indicator, or reference mode index, specifying the selection of one of the reference picture lists (e.g. for uni-prediction), or both reference picture lists (e.g. for bi-prediction), is coded together with a partition structure in Macro Block (MB) mode/sub-MB mode, while the indicators, or reference picture indices, specifying the selected reference pictures in the respective lists, are coded as separate syntax elements. "Partition structure" refers to partitions, such as e.g. 16×16, 16×8 or 8×16, of a 16×16 MB. A partition, e.g. 16×16, is typically associated with one motion vector (MV) and one reference index when uni-prediction is used, and with two MVs and two reference indices when bi-prediction is used. An MV has a horizontal component MVx and a vertical component MVy that describes how pixels of the current partition are produced from the corresponding reference picture.

The number of reference pictures associated with a picture or partition depends on the reference mode associated with the same partition, i.e. whether it is uni-prediction or bi-prediction, etc. When decoding the reference information in a decoder, both the reference mode index and the one or more reference picture indices associated with a picture or partition must be correctly decoded, in order for the decoder to be able to decode the picture or partition correctly. Incorrect decoding of either of the reference mode index and the one or more reference picture indices may result in erroneous interpretation of the reference information.

The current methods of coding reference information, such as the method of AVC described above, require a relatively large number of bits in order to convey the reference information associated with each block. This is identified as inefficient in terms of coding efficiency.

SUMMARY

It would be desirable to enable an improved coding efficiency for reference information, i.e. the information identifying the one or more reference pictures used for prediction of a current frame. It is an object of the invention to enable an improved coding efficiency for reference information. Further, it is an object of the invention to provide a method and an arrangement for enabling an improved prediction of reference information. These objects may be met by a method and arrangement according to the attached independent claims. Optional embodiments are defined by the dependent claims. The prediction, encoding and decoding described below may be performed within the same entity or node, or in different entities or nodes.

According to a first aspect, a method is provided in a video decoding entity. The method comprises obtaining an encoded block $B_e$, and a set of neighbor blocks of the encoded block, $B_e$, each neighbor block being associated with one or more reference pictures. The method further comprises determining the frequency of occurrence of a plurality of reference pictures or combinations of reference pictures amongst the reference pictures associated with the set of neighbor blocks. The method further comprises selecting a reference picture or combination of reference pictures having the highest determined frequency of occurrence amongst the reference pictures associated with the neighboring blocks, such as to be a prediction, Cpred, of the reference picture or combination of reference pictures, C, to be used when decoding the encoded block $B_e$. The method further comprises obtaining an indication specifying whether the prediction, Cpred, corresponds to C. When the prediction, Cpred, is indicated to correspond to C, the encoded block, $B_e$, is decoded based on the prediction Cpred. Thus a decoded block, B, of pixels is obtained.

According to a second aspect, an arrangement is provided in a video decoding entity. The arrangement comprises a functional unit, which is adapted to obtain an encoded block, $B_e$, and a set of neighbor blocks of the encoded block, $B_e$, where each such neighbor block is associated with one or more reference pictures. The arrangement further comprises a functional unit, which is adapted to determine the frequency of occurrence of a plurality of reference pictures or combinations of reference pictures amongst the reference pictures associated with the set of neighbor blocks. The arrangement further comprises a functional unit, which is adapted to select a reference picture or combination of reference pictures having the highest determined frequency of occurrence amongst the reference pictures associated with the neighbor blocks, to be a prediction, Cpred, of the reference picture or combination of reference pictures, C, to be used when decoding the encoded block, $B_e$. The arrangement further comprises a functional unit, which is adapted to—the obtaining unit (904) being further adapted to obtain an indication specifying whether the prediction, Cpred, corresponds to C. The arrangement further comprises a functional unit, which is adapted to decode the encoded block, $B_e$, based on the prediction Cpred, when the prediction, Cpred, is indicated to correspond to C, thus providing a decoded block, B, of pixels.

According to a third aspect, a method is provided in a video encoding entity. The method comprises determining the frequency of occurrence of a plurality of reference pictures or combinations of reference pictures amongst the reference pictures associated with a set of blocks, which are neighbors of a block B of pixels. The method further comprises selecting a reference picture or combination of reference pictures having the highest determined frequency of occurrence amongst the reference pictures associated with the neighbor blocks, to be a prediction, Cpred, of the reference picture or combination of reference pictures, C, used when encoding the block, B. The method further comprises determining whether the prediction, Cpred, corresponds to C, and providing an indication specifying the result of said determination to a decoder of the block.

According to a fourth aspect, an arrangement is provided in a video encoding entity. The arrangement comprises a functional unit, which is adapted to determine, for a block, B, having a set of encoded neighbor blocks, each being associated with one or more reference pictures used when encoding said neighbor block, the frequency of occurrence of a plurality of reference pictures or combinations of reference pictures amongst the reference pictures associated with the set of neighbor blocks. The arrangement further comprises a functional unit, which is adapted to select a reference picture or combination of reference pictures having the highest determined frequency of occurrence amongst the reference pictures associated with the neighbor blocks, to be a prediction, Cpred, of the reference picture or combination of reference pictures, C, used when encoding the block, B. The arrangement is further adapted to determine whether the prediction, Cpred, corresponds to C. The arrangement further comprises a functional unit, which is adapted to provide an indication specifying the result of said determination to a decoder of the block.

The above methods and arrangements may be used for improving coding efficiency. The coding efficiency may be improved, due to that the use of less bits in order to identify the one or more reference pictures used for prediction of a current frame is enabled. The above methods and arrangements may further enable an improved error resilience performance. Further, the above methods and arrangements allow reference picture index prediction to be carried out in a simple manner.

The above methods and arrangements may be implemented in different embodiments. In some embodiments the reference pictures associated with the neighbor blocks are identified by a combination of a reference mode parameter and one or more reference picture parameters. In other embodiments, the reference pictures associated with the neighbor blocks are identified by a single syntax element. By bundling of reference mode and index to form a single syntax element, easy manipulation of reference index numbers becomes feasible.

In some embodiments, the frequency of occurrence of reference pictures and/or combinations of reference pictures involves the counting of reference pictures and/or combinations of reference pictures associated with the neighboring blocks. Different occurrences of reference pictures or combinations of pictures may be assigned different weight, based on different criteria, such as e.g. the number of transform coefficients associated with the neighboring block with which the occurrence in question is associated.

The indication of whether Cpred corresponds to C may be signaled as a syntax element in the bit stream, or implicitly. When Cpred is indicated not to correspond to C further information may be conveyed, which enables the determining of which reference picture(s) to use when decoding the encoded block, $B_e$.

The determined frequency of occurrence of the reference pictures and/or combinations of reference pictures may be used for mapping indicators of the reference pictures or combinations of reference pictures to variable length code words. The indication of whether Cpred corresponds to C may be such a code word. The further information needed when Cpred is indicated not to correspond to C may also be signaled using such a code word. Thus, it may be assured that the shortest code words are used for the most probable alternatives.

Further, in some embodiments, one or more sub-regions of a block associated with multi-prediction may be identified, based on implicit information, in which sub-regions the respective corresponding regions of the multi-prediction reference blocks have a relatively low correlation between them. An alternative prediction may be used for the identified sub-regions, instead of the multi-prediction. The alternative prediction may be a single-prediction or weighted multi-prediction. The alternative prediction would be a prediction using only one of the reference blocks associated with the multi-prediction.

The embodiments above have mainly been described in terms of a method. However, the description above is also intended to embrace embodiments of the arrangements, adapted to enable the performance of the above described features. The different features of the exemplary embodiments above may be combined in different ways according to need, requirements or preference.

According to yet another aspect, a computer program is provided, which comprises computer readable code means, which when executed in one or more processing units, causes any of the arrangements described above to perform the corresponding procedure according to one of the methods described above.

According to yet another aspect, a computer program product is provided, which comprises the computer program of above.

BRIEF DESCRIPTION OF THE DRAWINGS

The invention will now be described in more detail by means of exemplifying embodiments and with reference to the accompanying drawings, in which:

FIGS. 1 and 2 are schematic views illustrating the determining of the frequency of occurrence of different combinations of a reference mode and one or more reference pictures associated with neighboring blocks of a current block, according to exemplifying embodiments.

FIG. 3 is a schematic view illustrating assignment of indicators (code words) to different index symbols, according to the prior art.

FIG. 4 is a schematic view illustrating assignment of indicators (code words), according to an exemplifying embodiment.

FIG. 12 is a table showing differences between AVC reference index representation and a reference index representation according to an example embodiment.

DETAILED DESCRIPTION

Figure 5:
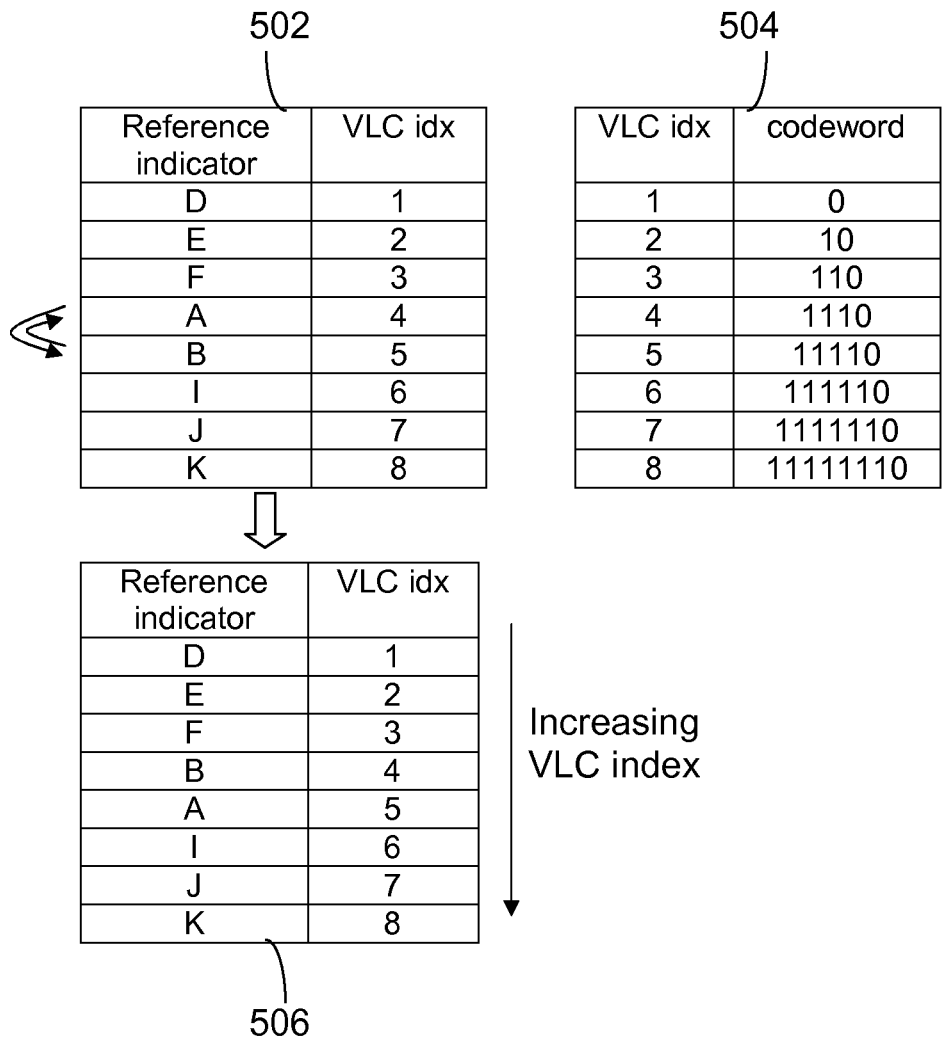
FIG. 5 is an illustration of assignment of code words to reference information, according to an exemplifying embodiment.

It is realized that one problem with existing video coding technology is that no satisfying reference mode/reference picture prediction scheme is defined or applied. It is realized that in, for example, a scene-cut/fading/flash scenario, it is quite common that the same e.g. combination of reference mode and reference pictures is used for the prediction of neighboring or adjacent MBs. Further, it is realized that the current coding methods do not take advantage of the correlation between the reference modes/reference picture(s) used for neighboring MBs. In previous solutions, the separate components identifying the MB reference information are encoded independently and conveyed to a video decoder.

Within this document it will be assumed that the indicators of the reference mode and one or more reference pictures used when encoding a block of pixels are jointly encoded, and thus all reference information necessary for decoding an encoded block will be represented by a single syntax element, for example denoted "reference indicator", "reference index", "reference index symbol" or "RIS index", where "RIS" stands for "Reference Index Signaling", or "Reference information Indicator Signaling", which will be described in more detail further below in this description. Such joint encoding provides a useful possibility to perform reference information prediction both for uni-prediction, using a single reference picture, and predictions using multiple reference pictures, such as e.g. bi-prediction, tri-prediction, and so forth. However, it should be noted that the procedure of reference information prediction described below could also be used for state of the art reference information representations, such as e.g. the reference mode index and reference picture list indices used in AVC.

Within this document, the term "neighboring blocks of block X" is used as referring to blocks which are neighbors of block X, i.e. located adjacent to or in the vicinity of block X. Further, within this document, the term "block" is used as referring to a unit of pixels. The term "reference picture" or "reference block" is used as referring to a previously coded/decoded picture, a block, a region or an area of a picture, which picture, block, region etc, is used as reference for prediction.

An exemplifying prediction scheme on MB level could be described as follows. The exemplifying prediction scheme applies to both encoder and decoder, and it could be applied for any block size.

In association with the encoding/decoding of a current MB, the encoder/decoder is arranged to analyze the reference indicators of the encoded MBs in the surrounding, also called "the context" of the MB. These surrounding blocks could also be denoted the "neighboring blocks" of the current block. The encoder/decoder counts the number of times each one out of a set of candidate indicators or indices appears amongst the neighboring blocks, and selects one, e.g. according to a predefined scheme, with the highest count, as being a prediction or estimate. The selected reference indicator should be related to inter prediction. The selected reference indicator is set to be a prediction or estimate of which reference picture(s) (and reference mode) that may be suitable to use when encoding/decoding the current MB. The prediction is derived through analysis of information related to the encoded/decoded neighboring blocks of the MB, rather than through analysis of the current MB itself. In an encoder, the MB may either be coded or encoded during this selection of a prediction, since in this example, the prediction is not to be used for the selecting of reference picture(s) (and reference mode) to use when encoding the current MB. In a decoder, the current MB is in a coded state during the prediction.

An exemplifying neighboring block reference indicator analysis and selection of an estimate is illustrated in FIG. 1. In the example illustrated in FIG. 1, four neighboring blocks of a current block are considered. However, the method is applicable also for other sets or subsets of considered neighboring blocks. An example set of neighboring blocks could consist of, e.g., a left block, a top left block and an above block relative to the current block. Another example set could comprise only the left block and above block. In FIG. 1, the neighboring blocks of the current block are associated with the respective reference indicators, or indices: 1, 1, 2 and 0. Thus, the reference indicator "1" has the highest count, i.e. the highest frequency of occurrence, by appearing twice amongst the neighboring blocks. Thus, the reference indicator "1" is selected to represent the prediction or estimate of the reference picture(s) (and mode) used, or to be used, when encoding the current block, or, when the prediction takes place in a decoder, the prediction of the reference picture(s) (and mode) to be used when decoding the current block.

FIG. 2 illustrates another exemplifying embodiment of determining the frequency of occurrence of certain reference indicators for a current block, by the counting of reference indicators associated with the neighboring blocks of the current block. Here, the current block is a large MB, and the neighboring blocks are smaller in size than the current block. In some cases it may be of interest to have the same number of neighboring blocks in the context independently of the block size of the blocks in question.

When counting the number of occurrences of a certain reference indicator amongst the neighboring blocks, more than one candidate may have the same highest counting number. This is illustrated in FIG. 2, where the reference indicators "1" and "2" both appear four times. This could be solved, e.g., by selecting the reference indicators in accordance with a predefined ranking scheme. For example, when the reference indicators are represented by the numbers 0-2, as illustrated in FIGS. 1 and 2, the reference indicator represented by the highest, or lowest, number could be selected as prediction.

The difference between a block of predicted pixel values and the original pixel values, i.e. the source before being encoded, is coded by transform coding, e.g. DCT (Discrete Cosine Transform). The output of the transform comprises transform coefficients, which are then quantized. The number of transform coefficients associated with a block reflects how good the match is between the predicted block and the original block, for the given quantization. Relatively few transform coefficients indicate that there is a good match. Consequently, reference indicators associated with neighboring blocks having few transform coefficients could be considered more reliable.

Thus, the counting of occurrences could also be weighted according to e.g. the coded transform coefficients associated with the reference blocks. As described above, a reference index associated with a neighboring block with few coded transform coefficients could be considered a more reliable prediction than a reference index associated with a neighboring block with many transform coefficients, and may thus be assigned a larger weight for the reference index prediction. In another example, blocks with coded coefficients may have larger weight than blocks without coded coefficients, i.e. skipped blocks. In another example, a reference index associated with a neighboring block that has a large MV partition, for example a large MB, could be considered more reliable than a neighboring block with a smaller MV partition, and would thus be assigned a larger weight for the reference index prediction. Using weights which are multiples of 2 is beneficial in view of complexity. The weighted counting could also be implemented by use of a lookup table.

Some reference indicators may be more related to each other than others. For example, when using jointly encoded reference information, the reference indicator representing bi-prediction using the reference frames ref0 and ref1 will be more related to the reference indicator representing uni-prediction using one of ref0 and ref1, than for example to a reference indicator representing uni-prediction using reference frame ref2. Thus, when counting a bi-prediction indicator, the corresponding indicators representing uni-prediction using the same reference frames could be updated with some minor count value, i.e. lower than the count value for a "full match". Similarly, reference indicators representing uni-prediction using e.g. ref0 and ref1 are more related to the corresponding reference indicator representing bi-prediction using ref0 and ref1, than to other bi-prediction reference indicators. Thus, when counting a unidirectional reference indicator, the count of reference indicators corresponding to a multi-prediction where the reference frame in question is used can also be updated with some minor value.

One advantage of introducing reference indicator prediction, or reference index prediction, is to allow more efficient mapping of a VLC (Variable length Coding) table. By considering prediction and the VLC table together, more compression can be obtained. For example, when assuming coding of 3 indices, e.g., (0, 1, 2), without the use of prediction, a fixed VLC table may be assigned, as the one illustrated in FIG. 3. Assuming that the index symbol "2" occurs most frequently, the table illustrated in FIG. 3 would have a sub-optimal design, since "2" is encoded using a codeword with two bits, i.e. "11", while the less frequent "0" is encoded using one bit, i.e. "0".

When prediction is added, a better VLC table design is enabled. An example of such an improved VLC table design is illustrated in FIG. 4. In such an improved VLC design, the bits spent for encoding a reference indicator or index symbol can be adapted based on the prediction and thus on the context of the current block. In the table illustrated in FIG. 4, the most frequently occurring reference indicator in the context of the current block is encoded using a single bit code word, in this example "0". The code words "10", and "11", comprising two bits, could be defined to identify e.g. the reference indicator having the second highest frequency of occurrence and the reference indicator having the third highest frequency of occurrence, respectively. Both the encoder and decoder of reference indicators should be aware of, and agree on, how to perform the prediction and how to interpret the code words.

The example described above is just a simple example, and it should be noted that the possible design is not limited to this. There are various ways to assign different VLC tables to reference indicators or index symbols, e.g. when more reference indicators or index symbols are involved. An example approach could be to vary the indexing with the probability of occurrence of the indices, such that a frequently occurring reference indicator is assigned a low index number, and vice versa, and that a low index number cost less bits to encode than a high index number. Context-Adaptive Binary Arithmetic Coding (CABAC) can be used to achieve varying bit cost for representing reference indicators or indices according to their probability. Some examples of different contexts are e.g. the reference indicators associated with the neighboring blocks, a counting number of reference indicators, or a weighted counting number of reference indicators, as described above.

Another approach is to employ so-called "bubble sorting" of the indices or numbers representing the reference indicators as they are occurring. In this example, a VLC bubble table is a fixed VLC table where the length of the code words increases with increasing VLC table index, such as in the AVC UVLC (Universal Variable Length Code) table, but where the mapping between the index symbols or numbers representing the reference indicators and the VLC table index is adaptive. The adaptation is done by the swapping of neighboring "mapping positions", much like the mechanisms in bubble sorting. An example of such swapping is illustrated in FIG. 5, where a symbol "A" is mapped to index 4 in the VLC table 504a and a symbol "B" is mapped to index 5 in the VLC table. Assume now that VLC index 5 (symbol B) is decoded. After decoding of symbol B, the index mapping of symbol A, which in table 502 was to VLC index 4, and symbol B swap positions, such that symbol A is mapped to VLC index 5 and symbol B is mapped to VLC index 4, as shown in table 506. With this strategy of neighbor index swapping, the VLC table becomes adapted such that the most probable symbols end up being mapped to low VLC indices and thus to short code words, giving improved compression efficiency.

Figure 6:
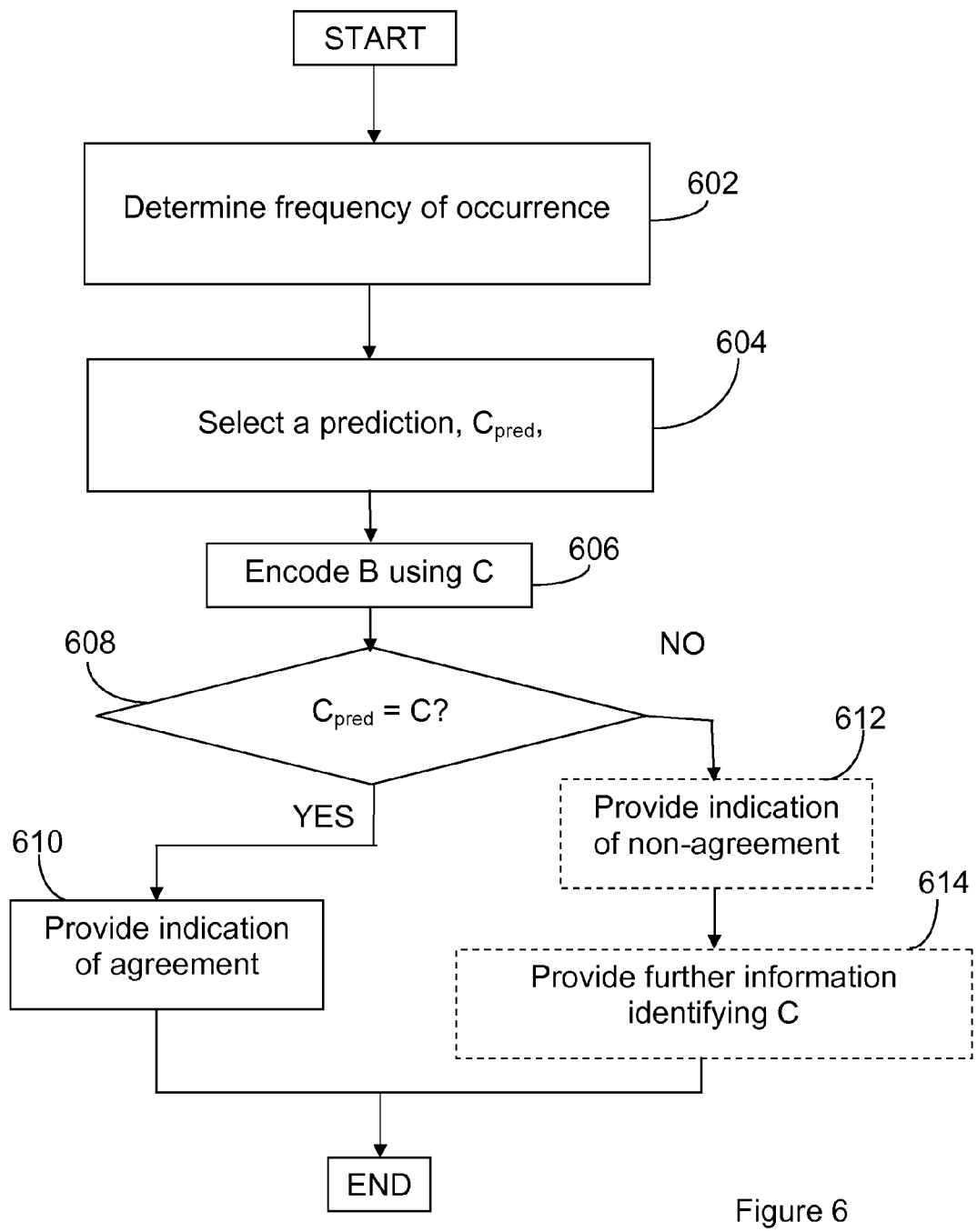
FIG. 6 is a flow chart illustrating a procedure for encoding of information related to a reference mode and one or more reference pictures, according to an exemplifying embodiment.

An embodiment of the encoding part of the procedure of reference indicator prediction will now be described with reference to FIG. 6. The procedure could be performed in a video encoding entity, which could be a video encoder or an entity comprising further functional units in addition to a video decoder, such as e.g. a computer, a mobile terminal or a video-dedicated device.

The procedure will be described as performed for a block, B, of pixels having a set of encoded neighboring blocks, where each neighboring block is associated with one or more reference pictures used when encoding said neighboring block. The frequency of occurrence of a plurality of reference pictures or combinations of reference pictures amongst the reference pictures associated with the set of neighboring blocks is determined in an action 602.

Then, a reference picture or combination of reference pictures having the highest determined frequency of occurrence amongst the reference pictures associated with the neighboring blocks is selected, in an action 604, to be a prediction, Cpred, of the reference picture or combination of reference pictures, C, used when encoding the block, B. The block B may have been encoded at this stage, or, it is still to be encoded.

When the block B has been encoded, e.g. in an action 606 which may or may not be considered a part of the described procedure, using the reference picture or combination of reference pictures C, it is determined in an action 608, whether the prediction, Cpred, corresponds to C, which was used when providing an encoded block $B_e$, by encoding of the block, B. The result of this determining action is provided to a decoder of the block, $B_e$, in an action 610 or 612. For example, when Cpred is determined to correspond to C, a predetermined bit in a bit stream could be set to "0", and when Cpred is determined not to correspond to C, the predetermined bit could be set to "1". Further, in the case when Cpred is determined not to correspond to C, further information identifying C could be provided to a decoder of $B_e$ in an action 614.

Below, an example arrangement 700, adapted to enable the performance of the above described procedure of reference indicator prediction will be described with reference to FIG. 7. The arrangement is illustrated as being located in a video encoding entity, 701, which could be a video encoder or an entity comprising further functional units in addition to a video encoder, such as e.g. a computer, a mobile terminal or a video-dedicated device. The arrangement 700 is further illustrated to communicate with other entities via a communication unit 702 which may be considered to comprise conventional means for any type of wired or wireless communication. Uncoded video to be encoded is assumed to be obtained from the communication unit 702 or a memory by an obtaining unit 704, and blocks of video are assumed to be encoded in an encoding unit 712, where the functional unit 712 uses conventional methods.

The arrangement 700 comprises a determining unit 706, which is adapted to determine, for a block, B, received from the obtaining unit 704, the block B having a set of encoded neighboring blocks, each being associated with one or more reference pictures used when encoding said neighboring block, the frequency of occurrence of a plurality of reference pictures or combinations of reference pictures amongst the reference pictures associated with the set of neighboring blocks. The arrangement 700 further comprises a selecting unit 708, which is adapted to select a reference picture or combination of reference pictures having the highest determined frequency of occurrence amongst the reference pictures associated with the neighboring blocks, to be a prediction, Cpred, of the reference picture or combination of reference pictures, C, used when providing an encoded block $B_e$ by encoding the block, B.

The determining unit 706 is further adapted to determine whether the prediction, Cpred, corresponds to C. The arrangement 700 further comprises a providing unit 710, adapted to provide an indication specifying the result of said determination to a decoder of the block, $B_e$.

An embodiment of the decoding part of the procedure of reference indicator prediction will now be described with reference to FIG. 8. The procedure could be performed in a video decoding entity, which could be a video decoder or an entity comprising further functional units in addition to a video decoder. An encoded block $B_e$ and a set of neighboring blocks of $B_e$ are obtained in an action 802. The block $B_e$ has been encoded by a video encoder at some point, e.g. in the manner described above, and is provided to the decoding entity, e.g. by means of wireless and/or wired transmission using suitable transmission protocol(s). Each of the neighboring blocks is associated with one or more reference pictures or frames, which were used when encoding the blocks in the encoder.

The frequency of occurrence of a plurality of the reference pictures amongst the reference pictures associated with the set of neighboring blocks, is determined in an action 804. It could also be the frequency of occurrence of combinations of the pictures that is determined, e.g. combinations of certain reference pictures used for bi-, or tri-prediction. The reference pictures may be represented or identified by a combination of a reference mode parameter, such as a reference mode index, and one or more reference picture parameters, such as reference picture indices, associated with the neighboring block. Further, the combinations of reference mode parameters and one or more reference picture parameters may be jointly encoded, such as to be represented or identified by a single syntax element, e.g. denoted "reference indicator", "reference index", or "reference index symbol", as previously described.

When having determined the frequency of occurrence of the respective reference pictures or combinations of reference pictures, typically represented by a reference mode parameter and one or more reference picture parameters, possibly represented by a reference indicator, one of the reference pictures or combinations of reference pictures having the highest frequency of occurrence is selected to be or represent a prediction, Cpred, of the one or more reference pictures or frames, C, used when encoding the block $B_e$ in an encoder, and thus is/are to be used when decoding the block $B_e$.

Further, an indication specifying whether the prediction, Cpred, corresponds to the actual one or more reference pictures, C, to be used when decoding the block $B_e$, is obtained in an action 808. The action 808 may be performed before, during or after the actions 802-806. The indication may be obtained, e.g., as a one bit code word or a flag in a bit stream. When it is specified that Cpred corresponds to C, which could be manifested, e.g., by the arrival of the code word "0" in a predefined position (cf. FIG. 4), the encoded block, $B_e$, is decoded in an action 812, based on the prediction Cpred. That is, $B_e$ is decoded using the one or more reference pictures having the highest frequency of occurrence amongst the reference pictures associated with the neighboring blocks, and being selected to be the prediction Cpred. By the decoding of $B_e$, a decoded block, B, of pixels, is obtained or provided.

The indication specifying whether Cpred corresponds to C could further be implicit, e.g. manifested by the omission of performing some action, e.g. adding "1" to a counter, or by refraining from toggling of a flag.

When the prediction, Cpred, is indicated not to correspond to C, further information may be obtained in an action 814, in order to determine which reference picture(s) to use when decoding the encoded block, $B_e$. When having obtained further information identifying the appropriate one or more reference pictures, block $B_e$ is decoded using said information in an action 816.

Below, an example arrangement 900, adapted to enable the performance of the above described procedure of reference indicator prediction, will be described with reference to FIG. 9. The arrangement is illustrated as being located in a video decoding entity, 901, which could be a video decoder or an entity comprising further functional unit in addition to a video decoder, such as e.g. a computer, a mobile terminal or a video-dedicated device. The arrangement 900 is further illustrated to communicate with other entities via a communication unit 902 which may be considered to comprise conventional means for any type of wired or wireless communication.

The arrangement 900 comprises an obtaining unit 904, which is adapted to obtain an encoded block, $B_e$, to be decoded, and a set of neighboring blocks of the encoded block, $B_e$, where each neighboring block is associated with one or more reference pictures, i.e. the pictures used when encoding the block, also to be used when decoding the block. The reference picture(s) associated with a neighboring block may be identified based on a combination of a reference mode parameter and one or more reference picture parameters associated with the block, or alternatively, e.g. based on a single syntax element associated with the block. The obtaining unit 904 may also be regarded as part of the communication unit 902.

The arrangement 900 further comprises a determining unit 906, which is adapted to determine the frequency of occurrence of a plurality of reference pictures or combinations of reference pictures amongst the reference pictures associated with the set of neighboring blocks. For example, by counting the respective number of neighboring blocks that are associated with e.g. both of the reference pictures A and B; that are associated with only D; only A, etc., or similar. This could also be described as counting the number of occurrences of association with certain reference pictures or combinations of reference pictures amongst the neighboring blocks, or as counting the number of occurrences of e.g. a reference picture amongst the set of neighboring blocks.

The different associated reference pictures and combinations could be assigned different weight. For example, when counting the number of occurrences of (association with) the combination of reference picture A and B, the occurrences of association with only reference picture B could be assigned a low weight, and thus contribute to a minor extent to the sum of occurrences of "A+B". Further, one occurrence of association with reference picture D could be assigned a higher weight than another occurrence of association with reference picture D, when in the first occurrence, D is associated with a block having e.g. a lower number of transform coefficients.

The arrangement 900 further comprises a selecting unit 908, which is adapted to select a reference picture or combination of reference pictures having the highest determined frequency of occurrence amongst the reference pictures or combinations of reference pictures associated with the neighboring blocks, to be a prediction, Cpred, of the reference picture or combination of reference pictures, C, which (C) is to be used when decoding the encoded block, $B_e$. There may be several reference pictures or combinations of reference pictures sharing the same frequency of occurrence. In such a situation, one of these pictures or combinations should be selected based on a predefined scheme or rules defining how to select reference pictures.

The obtaining unit 904 is further adapted to obtain an indication specifying whether the prediction, Cpred, corresponds to C. For example, when Cpred corresponds to C, a predefined bit obtained from a bit stream may be "0", and when Cpred does not correspond to C, the predefined bit could be "1". The arrangement 900 further comprises a decoding unit 910, which is adapted to decode the encoded block, $B_e$, based on the prediction Cpred, when the prediction, Cpred, is indicated to correspond to C. The decoding unit 910 thus provides a decoded block, B, of pixels, which may e.g. be stored or displayed.

The arrangement 900 may further be adapted to obtain further information in order to determine which reference picture(s) to use when decoding the encoded block, $B_e$, when the prediction, Cpred, is indicated not to correspond to C, i.e. when further information is needed in order to identify the true C. Such information may be available e.g. in form of a VLC code word.

Figure 9:
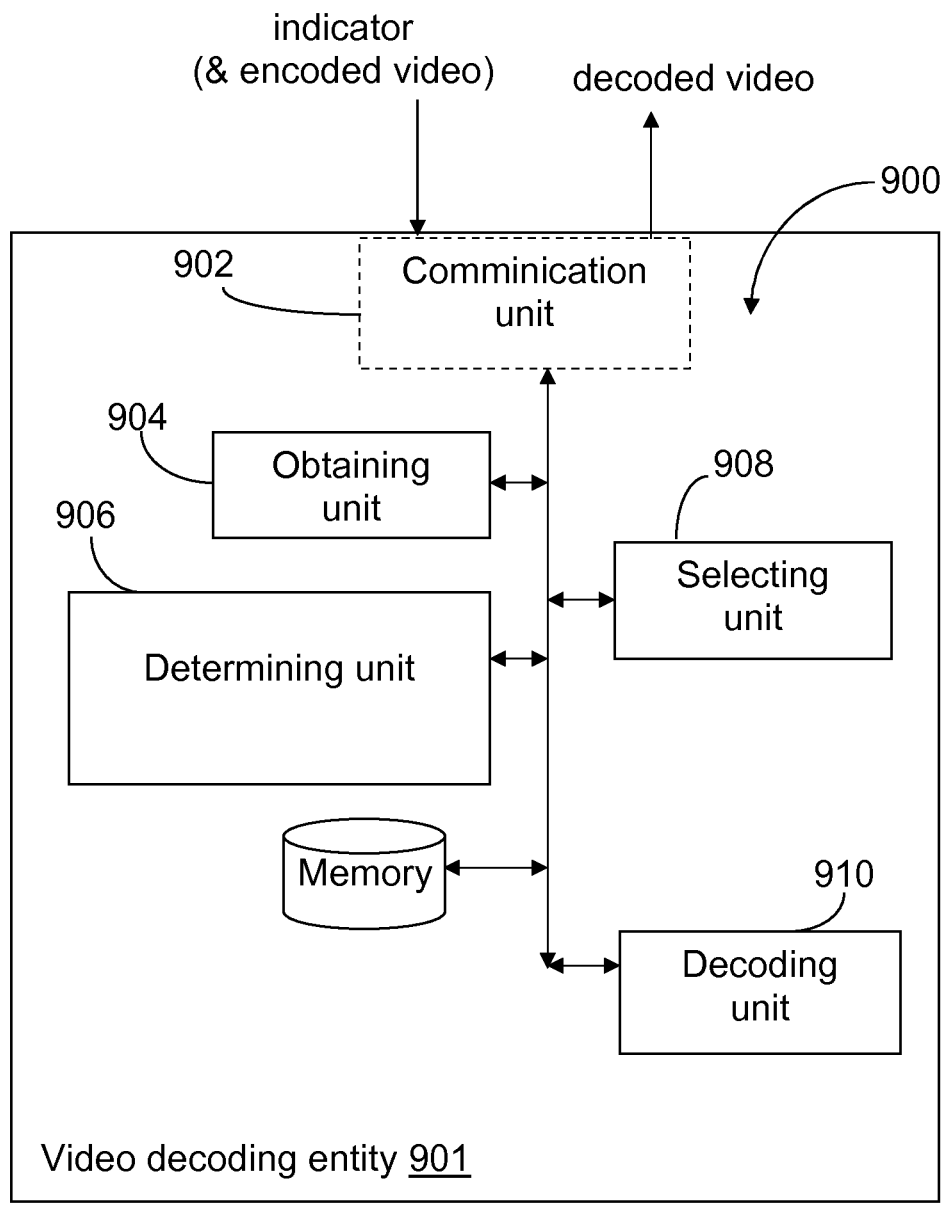
FIG. 9 is a block diagram illustrating an arrangement adapted for decoding of information related to a reference mode and one or more reference pictures in a video decoding entity, according to an exemplifying embodiment.
Figure 10:
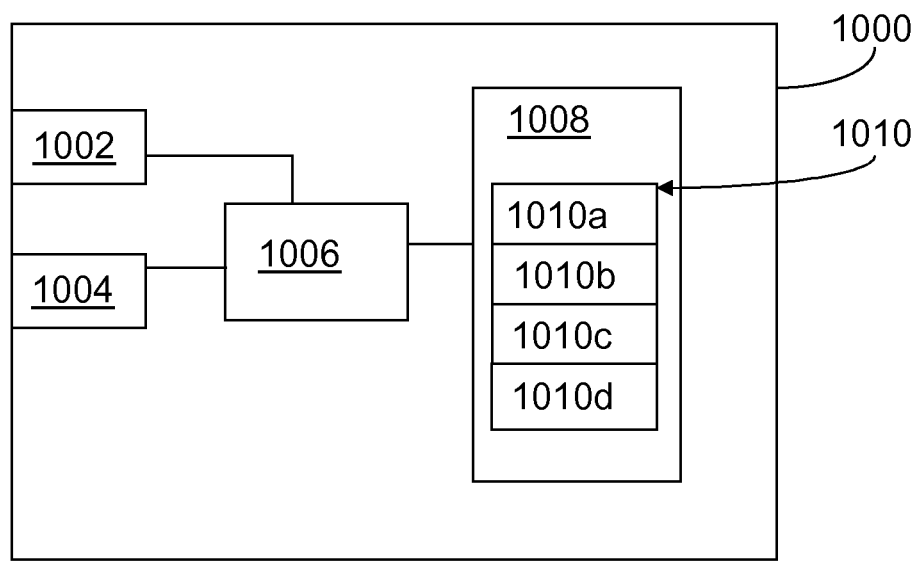
FIG. 10 is a schematic view illustrating an arrangement in a video encoding/decoding entity, according to an exemplifying embodiment.

FIG. 10 schematically shows an embodiment of an arrangement 1000 in a video decoding entity, which also can be an alternative way of disclosing an embodiment of the arrangement for reference indicator prediction in a video decoding entity illustrated in FIG. 9. Comprised in the arrangement 1000 are here a processing unit 1006, e.g. with a DSP (Digital Signal Processor). The processing unit 1006 can be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile memory, e.g. an EEPROM (Electrically Erasable Programmable Read-Only Memory), a flash memory and a hard drive. The computer program product 1008 comprises a computer program 1010, which comprises code means, which when executed in the processing unit 1006 in the arrangement 1000 causes the arrangement and/or the video decoding entity to perform the actions of the procedure described earlier in conjunction with FIG. 8.

The computer program 1010 may be configured as a computer program code structured in computer program modules. Hence in the example embodiments described, the code means in the computer program 1010 of the arrangement 1000 comprises an obtaining module 1010a for obtaining an encoded block, $B_e$, and a set of neighboring blocks of the encoded block, $B_e$, e.g., from a bit stream originating from a data transmitting entity or from a storage, e.g. a memory. The obtaining module 1010a is also for obtaining an indication of the result of a comparison. The computer program further comprises a determining module 1010b for determining the frequency of occurrence of a plurality of reference pictures or combinations of reference pictures amongst the reference pictures associated with the set of neighboring blocks.

The computer program 1010 further comprises a selecting module 1010c for selecting a reference picture or combination of reference pictures having the highest determined frequency of occurrence amongst the reference pictures associated with the neighboring blocks, to be a prediction, Cpred, of the reference picture or combination of reference pictures, C, where C is to be used when decoding the encoded block, $B_e$. The computer program 1010 further comprises a decoding module 1010d for decoding the encoded block, $B_e$, based on the prediction Cpred, when the prediction, Cpred, is indicated to correspond to C.

Figure 8:
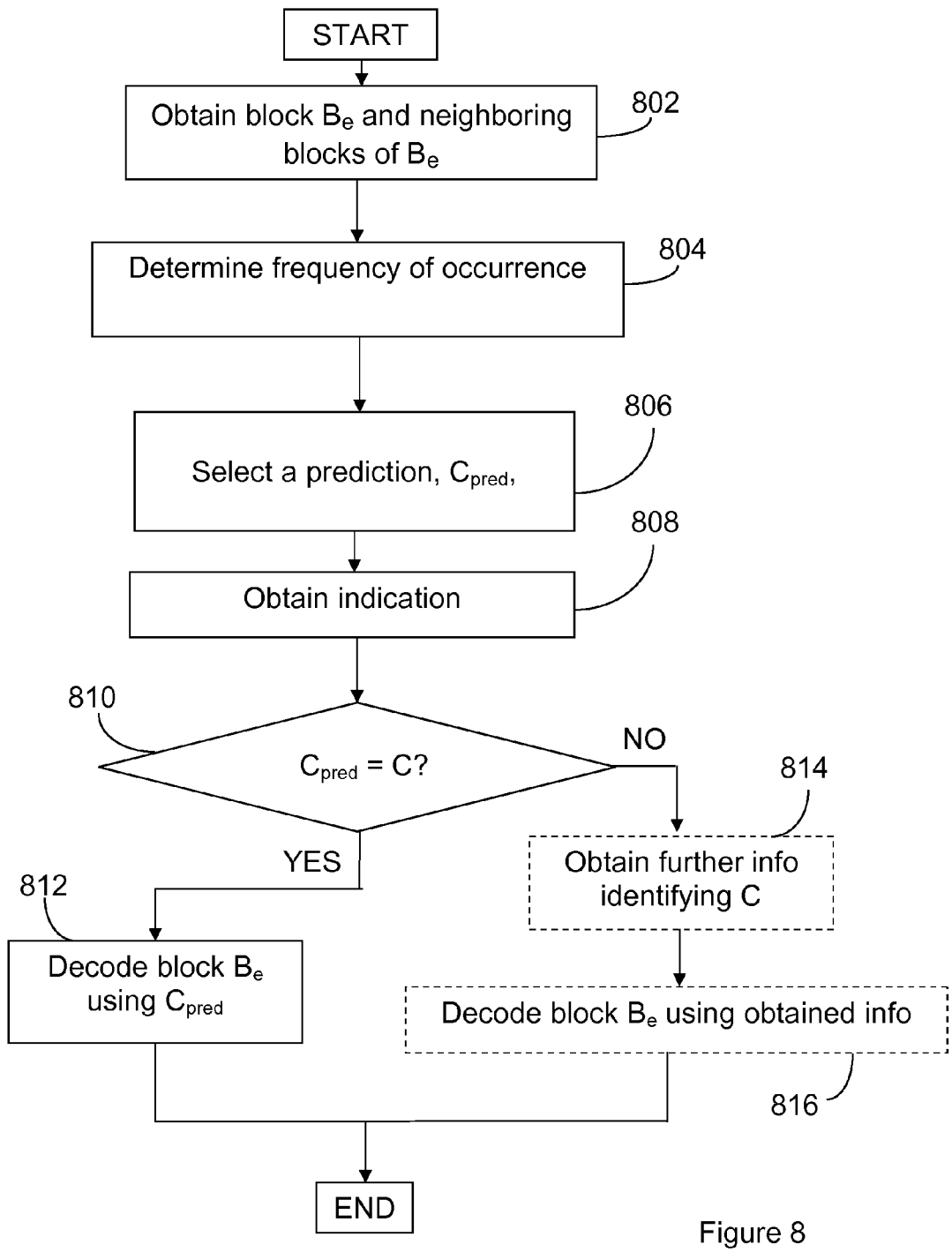
FIG. 8 is a flow chart illustrating a procedure for decoding of information related to a reference mode and one or more reference pictures, according to an exemplifying embodiment.

The modules 1010a-d could essentially perform the actions of the flow illustrated in FIG. 8, to emulate the arrangement in a video decoding entity illustrated in FIG. 9. In other words, when the different modules 1010a-d are executed in the processing unit 1006, they correspond to the units 904-910 of FIG. 9.

Figure 7:
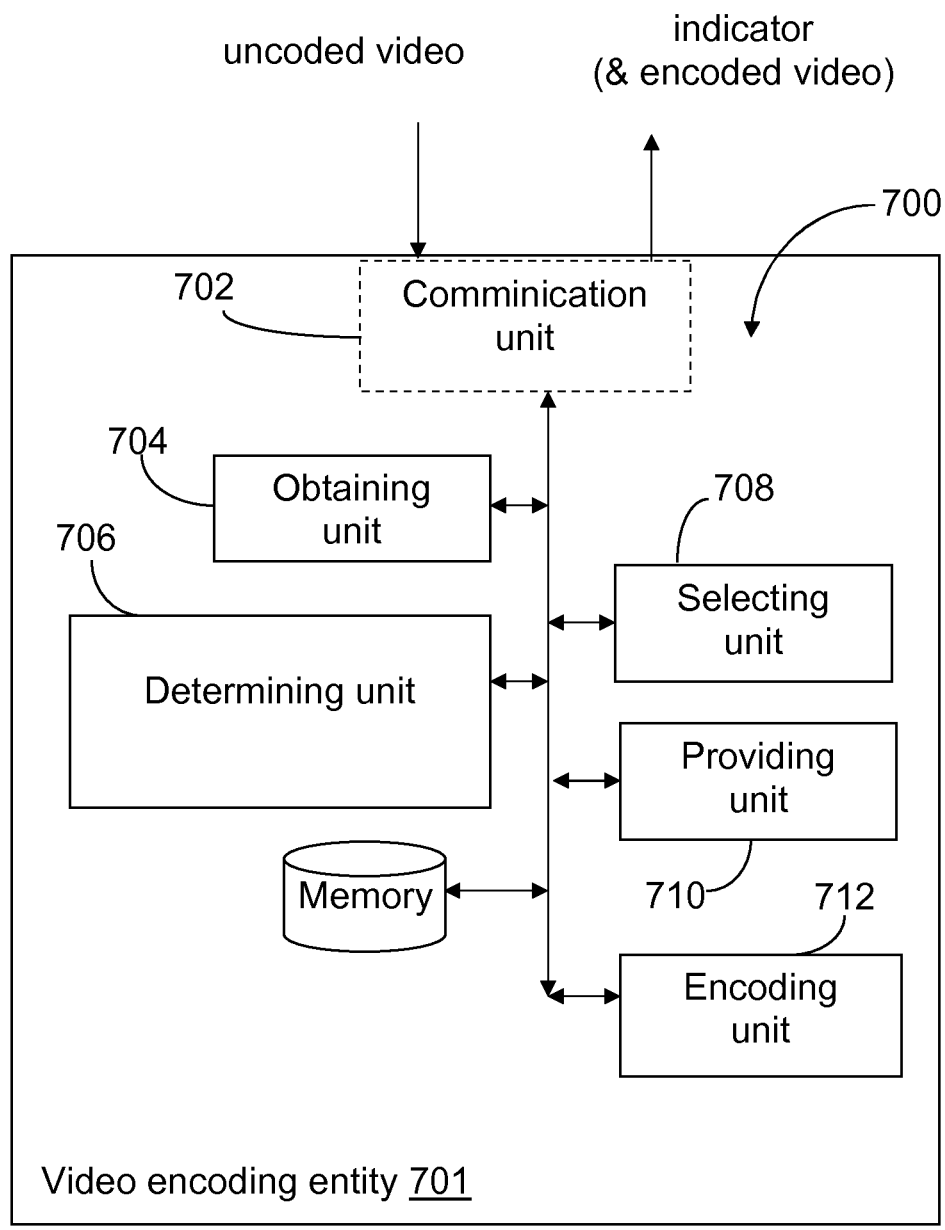
FIG. 7 is a block diagram illustrating an arrangement adapted for encoding of information related to a reference mode and one or more reference pictures in a video encoding entity, according to an exemplifying embodiment.

Similarly, a corresponding alternative to the arrangement illustrated in FIG. 7 is possible.

Although the code means in the embodiment disclosed above in conjunction with FIG. 10 are implemented as computer program modules which when executed in the processing unit causes the arrangement and/or video decoding entity to perform the actions described above in the conjunction with figures mentioned above, at least one of the code means may in alternative embodiments be implemented at least partly as hardware circuits.

The processor may be a single CPU (Central processing unit), but could also comprise two or more processing unit. For example, the processor may include general purpose microprocessors; instruction set processors and/or related chips sets and/or special purpose microprocessors such as ASICs (Application Specific Integrated Circuit). The processor may also comprise board memory e.g. for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program product in the form of memories within the decoding entity.

As previously described, it is assumed in this document that the indicators of the reference mode and one or more reference pictures used when encoding a block of pixels are jointly encoded, and thus all reference information necessary for decoding an encoded block will be represented by a single syntax element, which for example could be denoted "reference indicator", "reference index", "reference index symbol" or "RIS index". This joint encoding will now be further described. The joint encoding is a procedure for representing and conveying reference information, i.e. reference mode(s) and reference picture(s), to be used for inter predictive coding and decoding. The procedure may be referred to as Reference Index Signaling, or Reference information Indicator Signaling (RIS).

When using RIS, instead of e.g. encoding an indicator of the reference mode in close association with an indicator of the partition structure, i.e. MB/sub-MB mode, and encoding indicators of reference pictures separately, e.g. as in AVC, the indicator of reference mode and the indicator(s) of reference picture(s) associated with an encoded block are "bundled together in one place", i.e. are jointly encoded. The joint encoding of the indicators of reference mode and reference picture(s), i.e. reference information, results in that one single syntax element, or indicator, represents all information on reference mode(s) and reference picture(s) needed, in order to decode the encoded block in a satisfactory manner. That is, once this single syntax element is given for an encoded block, a decoder should be able to identify the reference picture(s) required for decoding the block. The "syntax element" may also be denoted e.g. "syntax unit", "joint indication unit" or "joint identification unit".

The use of such a syntax element may provide increased error resilience for the reference information identified by the syntax element. Further the use of such a syntax element will enable the utilization of that some combinations of reference index and reference mode are more probable than others, by enabling efficient coding of these combinations. For example, shorter code words could be assigned to more probable combinations of reference index and reference mode.

Figure 11:
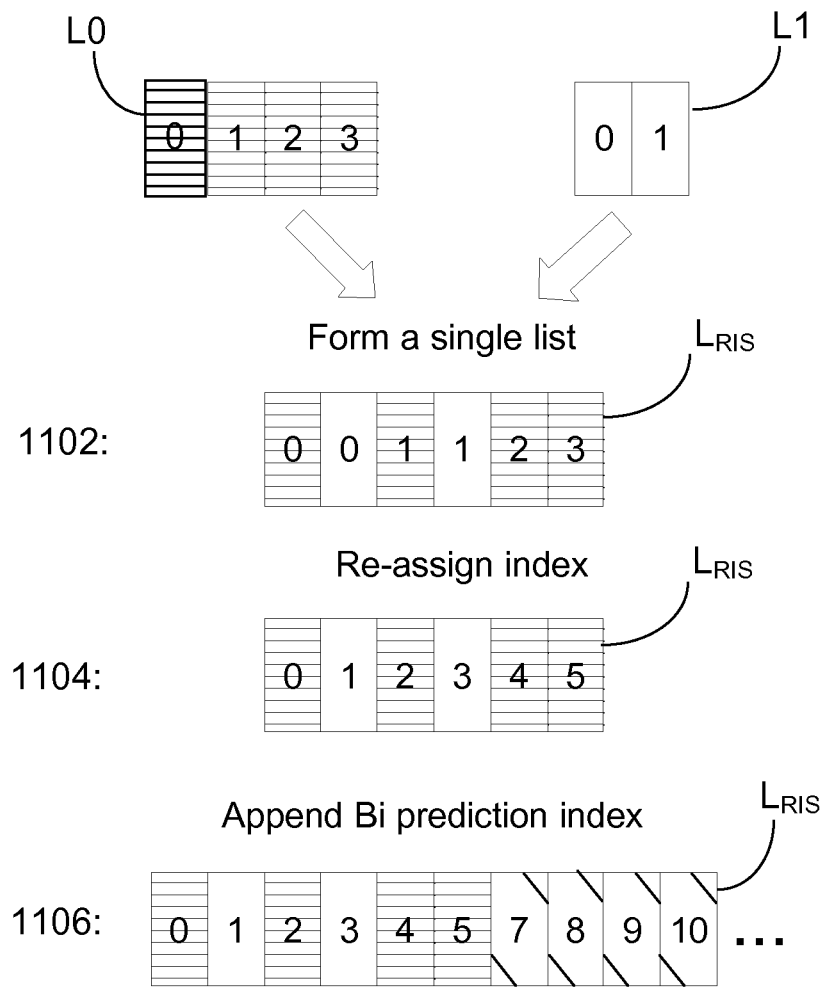
FIG. 11 is a schematic view illustrating a conversion from a reference information representation according to the prior art to a reference information representation according to an example embodiment.

One way to describe RIS is to describe a "conversion" or mapping from a traditional representation, such as e.g. the AVC representation of reference information using two separate lists, to an illustrative representation of reference information according to RIS. Such a conversion to RIS representation could basically be made in three steps, as illustrated in FIG. 11.

The first step 1102 could be to form one single reference index list from multiple index lists. For example, instead of managing two reference index lists, as in AVC, all reference picture indices may be sorted in a certain order into a single joint list, as an alternative or a complement to the two lists of AVC. This is illustrated in FIG. 11, where the picture reference index lists I0 and I1 are merged, or multiplexed, into a new list $L_{RIS}$, in an interleaved way. Further, in a second step, 1104, the index numbers may be re-assigned accordingly, to follow a consecutive order, i.e. 0-5 in the new list $L_{RIS}$.

The index numbers, or entries, in the list $L_{RIS}$ after step 1104, represent information regarding both a reference mode (backward or forward uni prediction) and a reference picture. An index to an entry in $L_{RIS}$ may be denoted, e.g. a "RIS index" or "RIS-parameter". The RIS index numbers 0-5 in $L_{RIS}$, after step 1104 in this example, represent uni-prediction from four past pictures (originally in L0=(0, 1, 2, 3)), and two future pictures (originally in L1=(0, 1)).

Further, one or more list entries representing bi-prediction may be added to $L_{RIS}$, e.g. by insertion or appending. Thus, RIS indices indicative of the entries representing bi-prediction do not point to a single reference picture but rather to two reference pictures. Thus, a RIS index can identify a combination of a reference mode and one or more reference pictures.

Consequently, in a final step 1106, entries related to bi-prediction mode, where two reference pictures are used for prediction, may be appended consecutively to $L_{RIS}$, and be indicated or represented by RIS indices. For example, the entry with RIS index number 7 can be set to signal or imply that the current picture is using picture number 0 and picture number 1 as bi-prediction references. Thus, this information is inherent in the RIS index 7. Index number 8 can in a similar way be set to imply that the current picture is using picture number 0 and picture number 2 as bi-prediction references. Analogously, the list $L_{RIS}$ may further be extended with entries representing tri-prediction, identifying three reference pictures, and so forth.

Alternatively, the steps 1104 and 1106 may be performed in the reverse order, such that the entries related to bi-prediction mode are first added, e.g. inserted or appended, and then the index numbers are re-assigned accordingly. As previously described the entries related to bi-prediction mode could also be inserted, e.g. between the entries related to uni-prediction, which would require that re-assignment of index numbers was performed after the insertion, as a complement or alternative to step 1104. In this example, the mapping is represented by a single reference list, of which the indices of the different entries represent a reference mode and one or more reference pictures. It should be noted that this is just an optional example, and that the mapping may involve several steps, and that no explicit list or record of the exemplified type is requisite for performing the mapping.

An example of the difference between an AVC reference index representation and a RIS index representation, according to an example embodiment, is shown in a table in FIG. 12. In this example, it is assumed that there are four reference pictures available for coding of a current picture, of which two reference pictures are past reference pictures and two are future reference pictures. In this example RIS representation, the indices 0, 1, 3 and 4 are set to indicate uni prediction from a respective one of the four reference pictures. The indices 2 and 5 are set to indicate bi-prediction from a respective pair of the four reference pictures. It should be noted that the AVC-signaling of the reference indices also would comprise information related to partitions, since this information is coded together with the reference mode index, such as e.g. "INTER_16×16_L0". This is, however, not shown in FIG. 12.

Figure 13:
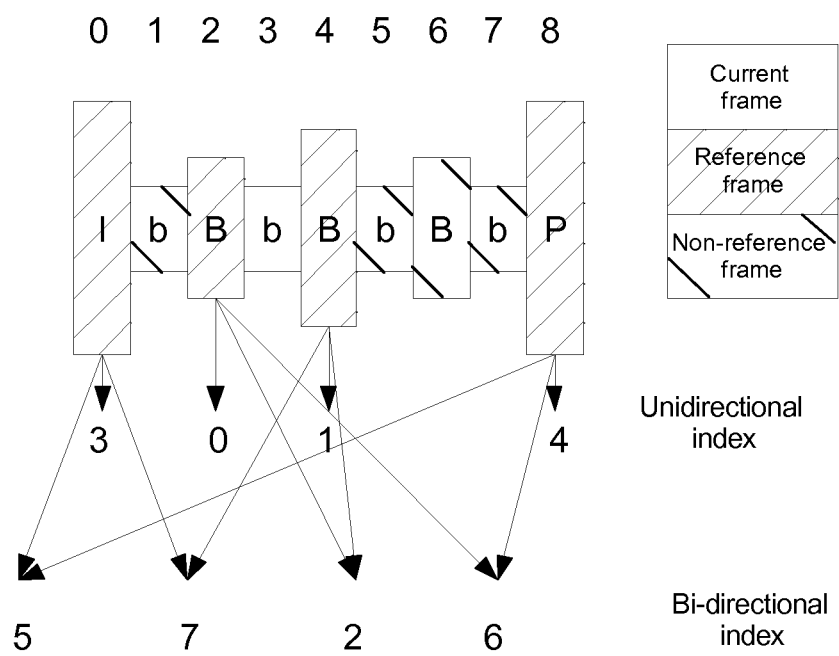
FIG. 13 is a schematic view illustrating assignment of reference information indicators according to an example embodiment.

In the example shown in the table in FIG. 12, some of the RIS indices indicating or representing bi-prediction are placed immediately after the "closed" uni-prediction RIS indices, i.e. interleaved with the indices representing uni-prediction. This RIS index representation is further illustrated in FIG. 13, which shows a so-called 7B hierarchical Group Of Pictures (BGOP). In the figure, the so-called "current frame" i.e. the frame to be encoded, is frame 3 in the 7BGOP. The RIS indices shown in FIG. 13 correspond to the RIS indices 0-7 in the table in FIG. 12. An alternative RIS representation could be to let the RIS indices 0-3 indicate uni-prediction, and the following RIS indices indicate bi-prediction, as in the example illustrated in FIG. 11.

In state of the art, e.g. using H.264, the generation of a bi-prediction block using two MVs/reference pictures, blocks or areas, involves averaging over the two reference areas. When an MV points to a sub-pel (sub-pixel) position in a reference area, the sub-pel position pixel values need to be generated first, before averaging. The generation of sub-pel position pixel values is referred to as "spatial filtering.", i.e. the generation process involves spatial filtering of the respective reference areas. Thus, the state of the art process for generation of a bi-prediction block using two reference areas involves spatial filtering of the first area; spatial filtering of the second area, and finally averaging over the filtered areas. Spatial filtering is relatively demanding in terms of computational complexity.

It is realized that this computational complexity could be reduced, which will be described below. In order to reduce complexity, a block may first be constructed based on integer motion, e.g. by adding the two reference blocks together (without performing spatial filtering). This adding is an operation which is relatively cheap in berms of computational complexity. Then, the resulting block may be filtered, e.g. interpolated, in order to obtain e.g. half or quarter-pel resolution. The sub-pel adjustment can be performed according to one of the MVs, or based on e.g. separately coded/decoded additional information.

When a block is associated with more than one MV and reference index, which is here referred to as "multi-prediction", the respective uni-directional prediction component of the multi-prediction can be determined. Uni-prediction may be referred to as "single-prediction", as can also e.g. intra prediction. It is realized that partitioning information could be derived based on the absolute difference between these uni-directional predictions. The partitioning information could be derived both in the encoder and the decoder, in order to avoid overhead when conveying fine grained partition information.

In regions where the absolute difference between the uni-directional predictions is relatively large, a single unidirectional prediction or a special bi-prediction could be used. The single uni-directional prediction could be made according to the reference index and MV indicated in the bit stream for one of the uni-prediction component of the bi-prediction (or multi-prediction). In other regions of the block, where the absolute difference between the uni-directional predictions is relatively small, bi-prediction can be used as indicated in the bit stream for the block. The decision of whether to use a single bi-prediction/special bi-prediction for a region, or to use the bi-prediction indicated in the bit-stream, could be based e.g. on a comparison of the absolute difference between the uni-directional predictions associated with the region and a predefined threshold.

Assuming a bi-prediction block associated with 2 MVs and 2 reference areas. Conventionally, at this stage, this block is not further divided, but is encoded as is. However, it is realized that the "implied" information obtained from analyzing the absolute differences or the "difference map", could be used for dividing the block into further partitions, both in the encoder and decoder.

When the absolute difference of 2 reference areas or predictions is calculated, there will be some region(s) in the difference map with higher absolute value(s) and some region(s) with lower absolute value(s). A low value of the absolute difference in a region usually represents that the same object is depicted in this region in both reference areas. If different objects would be depicted in the region in the respective reference areas, the absolute difference would be relatively large. If the same object is depicted in a corresponding region in the respective reference areas, it is suitable and appropriate to average the regions. If the corresponding regions depict different objects, it does not make sense to average them.

For example, a threshold could be defined, where difference values higher than a threshold represent "different objects regions", and difference values lower than the threshold represent "same object regions". The block could be partitioned in accordance with these regions, according to a predefined scheme. As previously stated, the partitioning could be performed based on implicit information, i.e. without explicit signaling describing the partitioning. Another advantage of this is that "non square partitioning" can be supported. For example, when half of a ball is depicted in one block, the partitioning of the block could be made very precise around the outline, or contour, of the ball.

The encoder could signal to the decoder if the partitioning approach described above should be used. When having signaled that the partitioning approach should be used, the encoder may optionally signal, for regions having a relatively high absolute difference value, which of the uni-directional predictions to use or which special bi-prediction to use. For example, weighted bi-prediction (other than average and possibly with DC offset) could be used. In some cases it may be needed to code/decode some additional information to determine local parameters to be able to produce the special bi-prediction. The obtained partition information can also be used for prediction of partition information and the encoder may code changes compared to the predicted partition to be decoded and used by the decoder. Deriving partition information based on the difference between the reference areas can give a rough indication of how the partitioning should be done. Further refinement by sending refinements of the predicted partition information is also possible One example of how to obtain the partition information is to divide the block into e.g. 4 equally sized sub-blocks. Then, the sub-block with largest normalized SAD (Sum of Absolute Differences (divided by the number of pixels on which it was calculated)) may be divided, iteratively, into 4 equally sized regions if the normalized SAD of the sub-block is e.g. equal to or larger than the normalized SAD of the 4 times larger "parent" block. Normalized SAD refers to SAD per pixel or SAD per one specific sub-block size. Instead of SAD, other metrics of pixel differences could alternatively be used. One example is a metric with more weight on strong local image structure, e.g. edges/lines. A remaining sub-block, which is not divided further, is then set to be the partition that should use e.g. some modification of the bi-prediction or multi-prediction.

Figure 14:
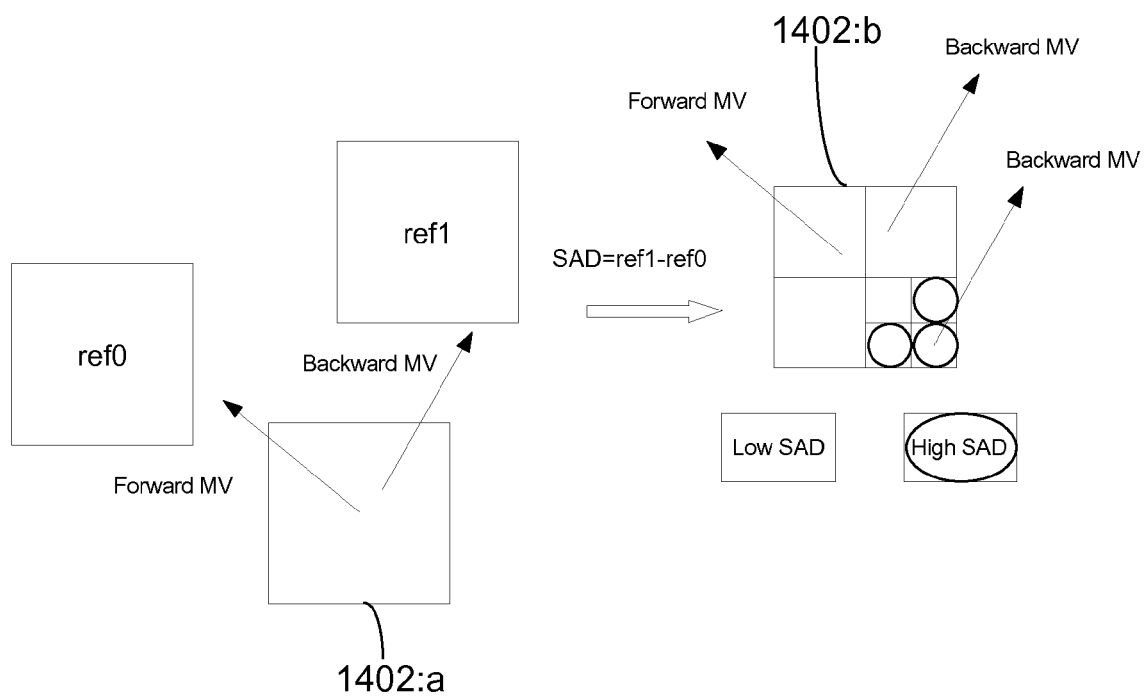
FIG. 14 is a schematic view illustrating partitioning based on implicit information, according to an exemplifying embodiment.

The FIG. 14 shows an exemplifying embodiment of the partitioning method. The block on the left side, 1402:a, is bi-predicted. SAD calculation is performed, and the high SAD areas are identified and selected out, and are handled accordingly. In this example, the high SAD area is handled by changing to uni-directional prediction with only backward MV. Thus, the original block may be partitioned into two partitions, of which one uses the bi-prediction indicated in the bit stream, and one (illustrated as comprising circles) uses uni-prediction (one of the component of the bi-prediction). Rate Distortion Optimization (RDO) could be used to select the best uni-prediction (component of the bi-prediction).

Another example of how to obtain partitioning information is to divide e.g. a bi-prediction block into a number of e.g. equally sized sub-blocks; determine the maximum SAD of the sub-block size in question, and select the sub-blocks having a SAD "close" to, e.g. within a certain interval from, this maximum value, to be part of a region that is to use some modified version of the bi-prediction, or a uni-directional prediction.

Besides partitioning, this approach can be used e.g. to determine the previously described RIS index or state of the art reference indices, when a bi-prediction mode is used. For example, a smooth difference map for a region may suggest, and be interpreted as, that the region is possibly associated with a "bi-RIS index". The approach could further be used as an alternative prediction or in combination with the previously described Reference Indicator index Prediction. The selection can be made in both the encoder and the decoder based on the SAD between possible candidates of bi-prediction to select the combination with least SAD.

It should be noted that with the above described multi-prediction based partitioning approach, instead of deriving a block-based partitioning, other kinds of partitioning could be derived both at the encoder and the decoder. This includes linear (e.g. horizontal, vertical, or diagonal) or non-linear partitioning of the block into two or more partitions, e.g. according to non-linear image processing methods such as edge detection and/or segmentation. For example, the multi-prediction difference signal can be segmented according to an image-segmentation method such as edge detection or region-growing, and then the block partition is derived based on the segmented difference signal.

The number of sub-partitions could be either derived through image-processing methods such as image segmentation, or could be signaled from the encoder to the decoder. As an alternative to linear or non-linear partitioning, also pixel-based partitioning can be applied. One variant would be to signal from the encoder to the decoder which partitioning method is used, another variant would be that the partitioning method is agreed between encoder and decoder through other signaling means. The advantage with multi-prediction based methods is that the partitioning information can be derived based on information that is already available at the encoder and the decoder, i.e. it does not have to be explicitly signaled, thus reducing the number of bits used for coding.

It should be noted that according to multi-prediction based partitioning, instead of switching from bi-prediction to uni-prediction with uni-directional MVs derived from the MVs used for bi-prediction, it is also possible to signal additional MVs and/or prediction modes (uni-directional inter-picture prediction, bi-directional inter-picture prediction, or intra-picture prediction) for sub-partitions. In other words, the number and shapes of the partitions for a block could either be explicitly signaled and/or be derived from implicit information, based on e.g. a segmentation method. Further, MVs and/or prediction mode may be signaled for some or all of the resulting sub-partitions.

While the procedure as suggested above has been described with reference to specific embodiments provided as examples, the description is generally only intended to illustrate the inventive concept and should not be taken as limiting the scope of the suggested methods and arrangement, which are defined by the appended claims. While described in general terms, the methods and arrangements may be applicable e.g. for different types of communication systems, using commonly available communication technologies, such as e.g. GSM/EDGE, WCDMA or LTE or broadcast technologies over satellite, terrestrial, or cable e.g. DVB-S, DVB-T, or DVB-C, but also for storage/retrieval of video to/from memory.

It is also to be understood that the choice of interacting units or modules, as well as the naming of the units are only for exemplifying purpose, and video handling entities suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

AVC Advanced Video Coding
CABAC Context Adapted Binary Arithmetic Coding
GOP Group Of Pictures
MB Macro Hock
MV Motion Vector
RIS Reference Index Signaling/Reference information Indicator Signaling
SAD Sum of Absolute Difference
VLC Variable Length Coding

The invention claimed is:

1. A method comprising a video decoding entity:
    obtaining an encoded block of pixels and a set of neighboring blocks of pixels that are neighbors of the encoded block of pixels, each neighboring block being associated with one or more reference pictures;
    determining a frequency of occurrence of a plurality of reference pictures and/or combinations of reference pictures amongst the reference pictures associated with the set of neighboring blocks;
    selecting a reference picture or combination of reference pictures, having a highest determined frequency of occurrence amongst the reference pictures associated with the neighboring blocks to be a prediction of the reference picture or combination of reference pictures to be used when decoding the encoded block;
    obtaining, from an encoder that encoded the block of pixels, an indication specifying whether the prediction corresponds to the actual reference picture or combination of reference pictures to be used when decoding the encoded block; and
    in response to the indication indicating that the prediction corresponds to the actual reference picture or combination of reference pictures, decoding the encoded block based on the prediction to provide a decoded block of pixels.

2. The method of claim 1 wherein the one or more reference pictures associated with each neighboring block are identified by a combination of a reference mode parameter and one or more reference picture parameters associated with the neighboring block.

3. The method of claim 1 wherein each neighboring block is associated with one syntax element identifying the one or more reference pictures that the neighboring block is associated with.

4. The method of claim 1 wherein the determining the frequency of occurrence of reference pictures and/or combinations of reference pictures comprises counting reference pictures and/or combinations of reference pictures associated with the neighboring blocks.

5. The method of claim 4:
wherein at least one occurrence of a reference picture or combination of reference pictures is assigned a higher weight than another occurrence of the reference picture or combination of reference pictures; and
wherein the reference picture or combination of reference pictures having the higher weight contributes more to a count.

6. The method of claim 5 wherein weights are assigned based on at least one of:
a match between a reference picture or combination of reference pictures associated with a neighboring block and the reference picture or combination of reference pictures of which the frequency of occurrence is determined;
a quantity of transform coefficients associated with one of the neighboring blocks; and
a magnitude of a motion vector partition associated with one of the neighboring blocks.

7. A video decoding entity, comprising:
memory; and
processing circuitry operatively connected to the memory and configured to:
obtain an encoded block of pixels and a set of neighboring blocks of pixels that are neighbors of the encoded block of pixels, each neighboring block being associated with one or more reference pictures;
determine a frequency of occurrence of a plurality of reference pictures and/or combinations of reference pictures amongst the reference pictures associated with the set of neighboring blocks;
select a reference picture or combination of reference pictures, having a highest determined frequency of occurrence amongst the reference pictures associated with the neighboring blocks, to be a prediction of the reference picture or combination of reference pictures to be used when decoding the encoded block;
obtain, from an encoder that encoded the block of pixels, an indication specifying whether the prediction corresponds to the actual reference picture or combination of reference pictures to be used when decoding the encoded block; and
decode, responsive to the prediction being indicated to correspond to the actual reference pictures or combination of reference pictures, the encoded block based on the prediction to provide a decoded block of pixels.

8. The video decoding entity of claim 7 wherein the video decoding entity is configured to identify the one or more reference pictures associated with each neighboring block based on a combination of a reference mode parameter and one or more reference picture parameters associated with the neighboring block.

9. The video decoding entity of claim 7 wherein each neighboring block is associated with one syntax element identifying the one or more reference pictures that the neighboring block is associated with.

10. The video decoding entity of claim 7 wherein the processing circuitry is further configured to determine the frequency of occurrence of reference pictures and/or combinations of reference pictures by counting reference pictures and/or combinations of reference pictures associated with the neighboring blocks.

11. The video decoding entity of claim 10 wherein the video decoding entity is configured to assign a higher weight to at least one occurrence of a reference picture or combination of reference pictures than to another occurrence of the reference picture or combination of reference pictures, the reference picture or combination of reference pictures having the higher weight contributing more to a count.

12. The video decoding entity of claim 11 wherein the video decoding entity is configured to assign weights based on at least one of:
a match between a reference picture or combination of reference pictures associated with a neighboring block, and the reference picture or combination of reference pictures of which the frequency of occurrence is determined;
a quantity of transform coefficients associated with one of the neighboring blocks; and
a magnitude of a motion vector partition associated with one of the neighboring blocks.

13. A method, in a video encoding entity, in which a selected block of pixels has a set of encoded neighboring blocks of pixels, each neighboring block being associated with one or more reference pictures used when encoding the neighboring block, the method comprising:
determining a frequency of occurrence of a plurality of reference pictures and/or combinations of reference pictures amongst the reference pictures associated with the set of neighboring blocks;
selecting a reference picture or combination of reference pictures having a highest determined frequency of occurrence amongst the reference pictures associated with the neighboring blocks to be a prediction of the reference picture or combination of reference pictures used when encoding the selected block;
determining whether the prediction corresponds to the actual reference picture or combination of reference pictures used when encoding the selected block to provide an encoded block; and
providing an indication specifying the result of the determination to a decoder of the encoded block to enable the decoder to determine whether a prediction derived in the decoder corresponds to the reference picture or combination of reference pictures used by the encoding entity when encoding the selected block of pixels.

14. The method of claim 13 wherein the one or more reference pictures associated with each neighboring block are identified by a combination of a reference mode parameter and one or more reference picture parameters associated with the neighboring block.

15. The method of claim 13 wherein each neighboring block is associated with one syntax element identifying the one or more reference pictures that the neighboring block is associated with.

16. The method of claim 13 wherein determining a frequency of occurrence of reference pictures and/or combinations of reference pictures includes counting reference pictures and/or combinations of reference pictures associated with the neighboring blocks.

17. The method of claim 16:
wherein at least one occurrence of a reference picture or combination of reference pictures is assigned a higher weight than another occurrence of the reference picture or combination of reference pictures; and
wherein the reference picture or combination of reference pictures having the higher weight contributes more to a count.

18. The method of claim 17 wherein the assigning of weights is based on at least one of:
- a match between a reference picture or combination of reference pictures associated with a neighboring block and the reference picture or combination of reference pictures of which the frequency of occurrence is determined;
- a quantity of transform coefficients associated with one of the neighboring blocks; and
- a magnitude of a motion vector partition associated with one of the neighboring blocks.

19. A video encoding entity comprising:
memory; and
processing circuitry operatively connected to the memory and configured to:
- determine, for a selected block of pixels having a set of encoded neighboring blocks of pixels, where each of the neighboring blocks is associated with one or more reference pictures used when encoding the neighboring block, a frequency of occurrence of a plurality of reference pictures and/or combinations of reference pictures amongst the reference pictures associated with the set of neighboring blocks;
- select a reference picture or combination of reference pictures, having a highest determined frequency of occurrence amongst the reference pictures associated with the neighboring blocks, to be a prediction of the reference picture or combination of reference pictures used when encoding the selected block of pixels to provide an encoded block of pixels;
- determine whether the prediction corresponds to the actual reference picture or combination of reference pictures used when encoding the selected block of pixels; and
- provide an indication specifying the result of the determination to a decoder of the encoded block, to enable the decoder to determine whether a prediction derived in the decoder corresponds to the actual reference picture or combination of reference pictures used by the encoding entity.

20. The video encoding entity of claim 19 wherein the video encoding entity is configured to identify the one or more reference pictures associated with each neighboring block based on a combination of a reference mode parameter and one or more reference picture parameters associated with the neighboring block.

21. The video encoding entity of claim 19 wherein each neighboring block is associated with one syntax element identifying the one or more reference pictures that the neighboring block is associated with.

22. The video encoding entity of claim 19 wherein the processing circuitry is further configured to determine the frequency of occurrence of reference pictures and/or combinations of reference pictures by counting reference pictures and/or combinations of reference pictures associated with the neighboring blocks.

23. The video encoding entity of claim 22:
- wherein the video encoding entity is configured to assign a higher weight to at least one occurrence of a reference picture or combination of reference pictures than to another occurrence of the reference picture or combination of reference pictures; and
- wherein the reference picture or combination of reference pictures having the higher weight contributes more to a count.

24. The video encoding entity of claim 23 wherein the video encoding entity is configured to assign weights based on at least one of:
- a match between a reference picture or combination of reference pictures associated with a neighboring block, and the reference picture or combination of reference pictures of which the frequency of occurrence is determined;
- a quantity of transform coefficients associated with one of the neighboring blocks; and
- a magnitude of a motion vector partition associated with one of the neighboring blocks.

25. A computer program product stored in a non-transitory computer readable medium for controlling a video decoding entity, the computer program product comprising software instructions which, when run on the video decoding entity, causes the video decoding entity to:
- obtain an encoded block of pixels and a set of neighboring blocks of pixels that are neighbors of the encoded block of pixels, each neighboring block being associated with one or more reference pictures;
- determine a frequency of occurrence of a plurality of reference pictures and/or combinations of reference pictures amongst the reference pictures associated with the set of neighboring blocks;
- select a reference picture or combination of reference pictures, having a highest determined frequency of occurrence amongst the reference pictures associated with the neighboring blocks, to be a prediction of the reference picture or combination of reference pictures to be used when decoding the encoded block;
- obtain, from an encoder that encoded the block of pixels, an indication specifying whether the prediction corresponds to the actual reference picture or combination of reference pictures to be used when decoding the encoded block; and
- in response to the indication indicating that the prediction corresponds to the actual reference picture or combination of reference pictures, decode the encoded block based on the prediction to provide a decoded block of pixels.

26. A computer program product stored in a non-transitory computer readable medium for controlling a video encoding entity, the computer program product comprising software instructions which, when run on the video encoding entity, causes the video encoding entity to:
- determine a frequency of occurrence of a plurality of reference pictures and/or combinations of reference pictures amongst the reference pictures associated with the set of neighboring blocks;
- select a reference picture or combination of reference pictures, having a highest determined frequency of occurrence amongst the reference pictures associated with the neighboring blocks, to be a prediction of the reference picture or combination of reference pictures used when encoding the selected block;
- determine whether the prediction corresponds to the actual reference picture or combination of reference pictures used when encoding the selected block to provide an encoded block; and
- provide an indication specifying the result of the determination to a decoder of the block encoded block to enable the decoder to determine whether a prediction derived in the decoder corresponds to the reference picture or combination of reference pictures used by the encoding entity when encoding the selected block.

* * * * *